(12) United States Patent
Piciaccia et al.

(10) Patent No.: US 7,809,271 B2
(45) Date of Patent: Oct. 5, 2010

(54) END-TO-END CHROMATIC DISPERSION CHARACTERIZATION OF OPTICALLY AMPLIFIED LINK

(75) Inventors: Stefano Piciaccia, Milan (IT); Fabrizio Forghieri, Modena (IT)

(73) Assignee: Cisco Technology Inc., San Jose, CA (US)

( * ) Notice: Subject to any disclaimer, the term of this patent is extended or adjusted under 35 U.S.C. 154(b) by 708 days.

(21) Appl. No.: 11/752,686

(22) Filed: May 23, 2007

(65) Prior Publication Data

US 2009/0003837 A1 Jan. 1, 2009

(51) Int. Cl.
*H04B 10/18* (2006.01)
(52) U.S. Cl. .................................. 398/81; 398/159
(58) Field of Classification Search .................. 398/81, 398/159
See application file for complete search history.

(56) References Cited

U.S. PATENT DOCUMENTS

| 5,969,806 | A | 10/1999 | Bergano |
| 2001/0050767 | A1* | 12/2001 | Babin et al. ............... 356/73.1 |
| 2002/0044322 | A1 | 4/2002 | Blumenthal et al. |
| 2002/0186437 | A1* | 12/2002 | Sasaoka ..................... 359/161 |

FOREIGN PATENT DOCUMENTS

JP 60140136 A 7/1985

* cited by examiner

*Primary Examiner*—Leslie Pascal

(57) ABSTRACT

An economic way of determining the chromatic dispersion along a link of a DWDM network is provided. A transmitter modulates the output signals of two lasers operating at two different wavelengths and the modulated output signals are sent into the link. Detectors at each one of a plurality of detection sites along the link determine a phase difference in modulation between the output signals of the two lasers. The chromatic dispersion for each detection site can be calculated from the modulation frequency and determined phase differences at that site.

18 Claims, 8 Drawing Sheets

END-TO-END CHROMATIC DISPERSION CHARACTERIZATION OF OPTICALLY AMPLIFIED LINK

BACKGROUND OF THE INVENTION

The present invention is related to techniques of determining chromatic dispersion in DWDM networks.

DWDM (Dense WDM) networks are optical networks in which optical signals at different wavelengths share an optical fiber. Each wavelength defines a particular communication channel. In a stricter sense, DWDM also refers to an ITU (International Telecommunications Union) standard which includes the specification of the particular channel wavelengths and the spacings between these channels and is based upon WDM (Wavelength Division Multiplexing), an earlier ITU standard in which the channel spacings were further apart and a smaller number of wavelength channels were carried by an optical fiber. It should be noted that the term DWDM, as used herein, refers to the first, more inclusive sense so as to include the ITU WDM and DWDM standards, unless specifically stated otherwise.

The speed of light in an optical fiber varies with wavelength. The resulting chromatic dispersion causes a signal pulse to spread out and become less distinct as it travels along an optical fiber. In optical networks, especially those with high bit rates, compensation for chromatic dispersion must be made for proper network operation. Typically one or more dispersion compensation units (DCUs) are inserted in a network span or link to offset the chromatic dispersion created in the optical signals traveling across the span or link. Thus it is very desirable to obtain an accurate measurement of chromatic dispersion in a span or link to ensure the proper compensation by the DCUs for signals traveling over the span or link. Furthermore, in many cases chromatic dispersion should be determined along the entire network link so that optical signals to and from users at sites along the link are properly compensated.

The present invention provides for a fairly inexpensive way of determining the chromatic dispersion of the optical fiber of a WDM link at one or more sites along the link.

DETAILED DESCRIPTION OF THE INVENTION

Figure 1:
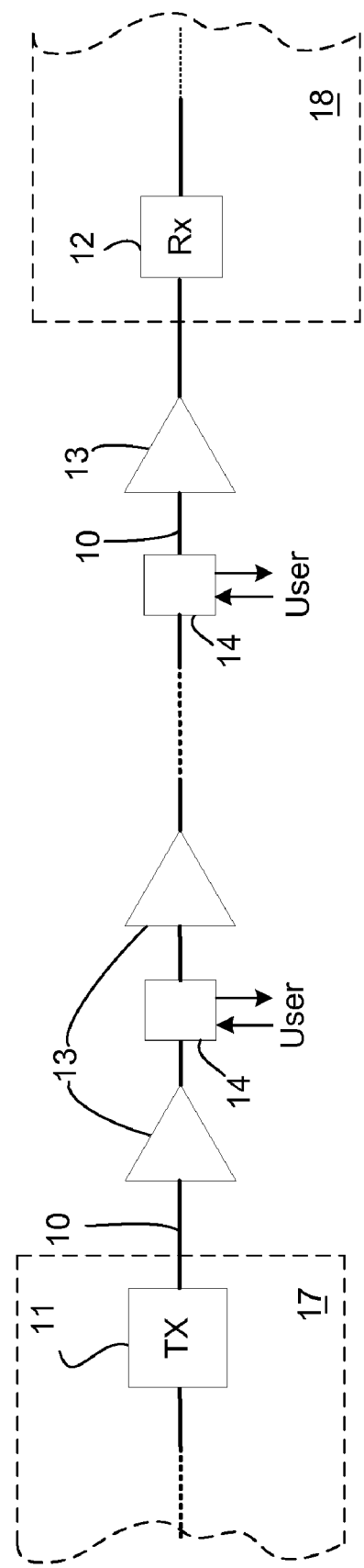
FIG. 1 is a representation of a link in a DWDM network.

In an overview of the present invention:

The present invention in one aspect provides for a method of determining chromatic dispersion along a link in a DWDM network. The method comprises the steps of: modulating in concert the output signals of first and second lasers with a given frequency, the first and second lasers operating at different wavelengths; sending the modulated output signals into the link; receiving the modulated output signals at a plurality of detection sites along the link; determining a phase difference in modulation between the output signals of the first and second lasers at each of the plurality of detection sites; and calculating chromatic dispersion at least one of the plurality of detection sites from the determined phase difference and said modulation frequency at the at least one of the plurality of detection sites.

The present invention in another aspect also provides for a method of determining the chromatic dispersion along a link in a DWDM network. The method comprises the steps of: turning off network traffic on the DWDM network; modulating in concert output signals of first and second lasers, the first and second lasers operating at different wavelengths; and sending the modulated output signals into the link to a plurality of detection sites so that the phase differences in modulation between the modulated output signals may be determined at each of the plurality of sites.

In one aspect the present invention provides for a method of determining chromatic dispersion along a link in a DWDM network. The method comprises the steps of: receiving two laser signals at different wavelengths at a plurality of detection sites along the link, the laser signals modulated in concert at a modulation frequency; determining a phase difference in modulation between the laser signals at each of the plurality of detection sites; and calculating chromatic dispersion for each of the plurality of detection sites from the modulation frequency and the determined phase difference in modulation between the output signals of the two lasers.

In a DWDM network having at least one link, the present invention in still another aspect provides for a transmitter apparatus for the determination of chromatic dispersion at a plurality of sites along the link. The apparatus comprises: at least two lasers, each laser having an output wavelength signal different from the other; a modulator modulating in concert output wavelength signals of the at least two lasers; and a multiplexer connecting the output wavelength signals to the link so that phase differences induced by chromatic dispersion upon the modulated output wavelength signals can be determined over the predetermined waveband and chromatic dispersion can be calculated from the determined phase differences at the plurality of sites.

In a DWDM network having at least one link, the present invention in another aspect provides for a detection apparatus for determining a chromatic dispersion along the link. The apparatus comprises: at least one filter adapted to receive optical signals at a site along the link and to output signals at the two different wavelengths; and a phase discriminator receiving the output signals from the at least one filter and determining a phase difference in modulation between the at least signals at the two different wavelengths to calculate chromatic dispersion for the site along the link.

A representative link of a DWDM network is illustrated in FIG. 1 in which a node 17 illustrated by broken lines is connected to a second node 18 also illustrated by broken lines. The network nodes 17 and 18 include couplers or optical switches (none shown) which direct optical signals to selected destinations in the optical network. Here, only the link between the two nodes is shown. The node 17 sends optical signals to the node 18 over the link in this example. Also shown are representational OADMs (Optical Add/Drop Multiplexers) 14 by which users receive, or drop, optical signals at selected wavelengths from the fiber 10 or send, or add, optical signals at selected wavelengths over the fiber 10, or both.

The link is formed by an optical signal transmitter 11, part of the network node 17, connected by an optical fiber 10 to an optical signal receiver 12, part of the network node 18. The transmitter 11 sends data signals to the receiver 12. Since the optical distance between the transmitter 11 and the receiver 12 may be quite long with many intervening elements, including the OADMs 14 and others (not shown), which attenuate the strength of the optical signals sent through the optical fiber 10, optical amplifiers 13 distributed along the length of the fiber 10 are typically used to compensate for the loss in signal strength as they travel the optical fiber 10.

As stated above, the speed of a light signal in an optical fiber is dependent upon signal's frequency. DCUs, which are typically part of some of the optical amplifiers 13, are used to ensure the integrity of the optical signal pulses as they travel over the link. Typically formed from long lengths of special optical fiber with chromatic dispersion characteristics reversed compared to those of the network fiber, e.g., the optical fiber 10, DCUs are installed to cancel out the chromatic dispersion induced by the network fiber. Nonetheless, the DCUs must be carefully selected along the link so that the compensation matches the chromatic dispersion induced along the link to ensure proper signal definition, a particular requirement for high bit rate networks.

The present invention provides for the easy and relatively inexpensive determination of chromatic dispersion of a plurality of spans along the link. A transmitter at the head of the link, the node 17 in the example network of FIG. 1, sends the output of two lasers at differing wavelengths. The laser output signals are modulated into signals which start out in phase over the optical fiber of the link. At selected sites along the link, detectors receive and filter the output signals into the two wavelength components. If there is any chromatic dispersion in the span from the transmitter to the detector, there is a phase difference between the wavelength components at the detector site. This measured difference is used to calculate the chromatic dispersion at the detector site. Furthermore, by varying the output wavelengths of one or more of the transmitter lasers over a waveband of interest, the detector can accumulate phase differences over the waveband to increase the accuracy of the phase difference measurement, to determine the chromatic dispersion slope and to determine the presence of a timing offset between the two detected signals.

Figure 3A:
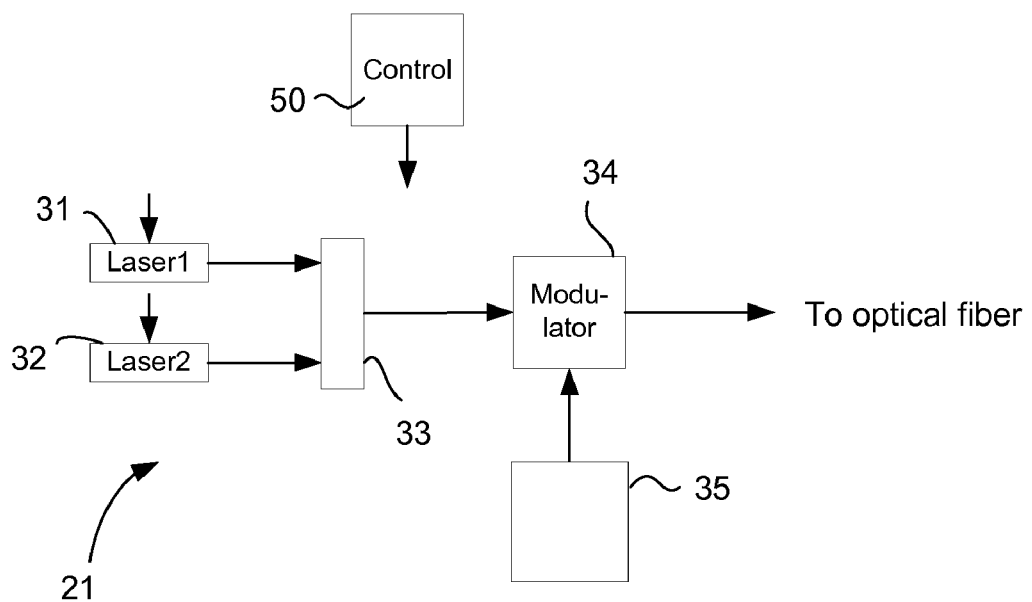
FIG. 3A is a block diagram of a FIG. 2 transmitter according to one embodiment of the present invention and FIG. 3B is a block diagram of another FIG. 2 transmitter according to an embodiment of the present invention.
Figure 3B:
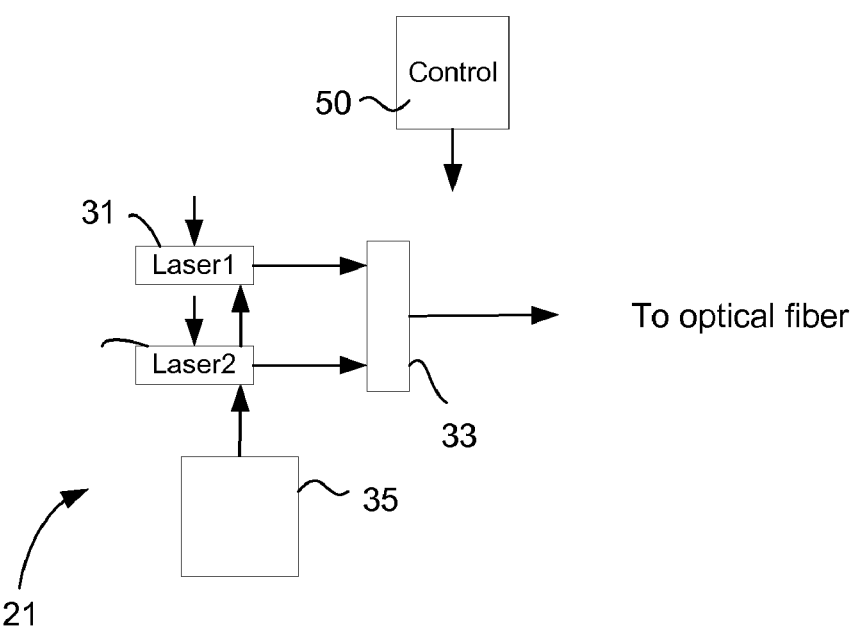

The phase differences are directly proportional to the group delay. Assuming $\Phi$ is the phase difference between optical signals at wavelengths $\lambda_1$ and $\lambda_2$, the difference in transit times from the transmitter 21 to the subject detector 23 of the optical signals at wavelengths $\lambda_1$ and $\lambda_2$, $t_1$-$t_2$ or $\Delta t$, is:

$$\Delta t = \frac{\Phi}{\Omega};$$

where $\Omega$ is the angular frequency of sinusoidal modulation, i.e., the frequency of the sinusoidal circuit 35 in FIGS. 3A and 3B; $\Delta t$ is the group delay time difference (in ps), due to fiber chromatic dispersion as follows:

$$\Delta t = D \cdot L \cdot \Delta \lambda$$

where $D \cdot L$ is the fiber chromatic dispersion (in ps/nm/km) times the fiber length (in km) and $\Delta\lambda$ is the wavelength difference between the two lasers. Note that $D \cdot L$ is the total dispersion of the link of interest, the only parameter of interest.

Furthermore, the detectors at the selected sites can determine the phase differences of the combined output signals of the two transmitter lasers concurrently so that the chromatic dispersion of the different spans can be also be determined concurrently.

Figure 2:
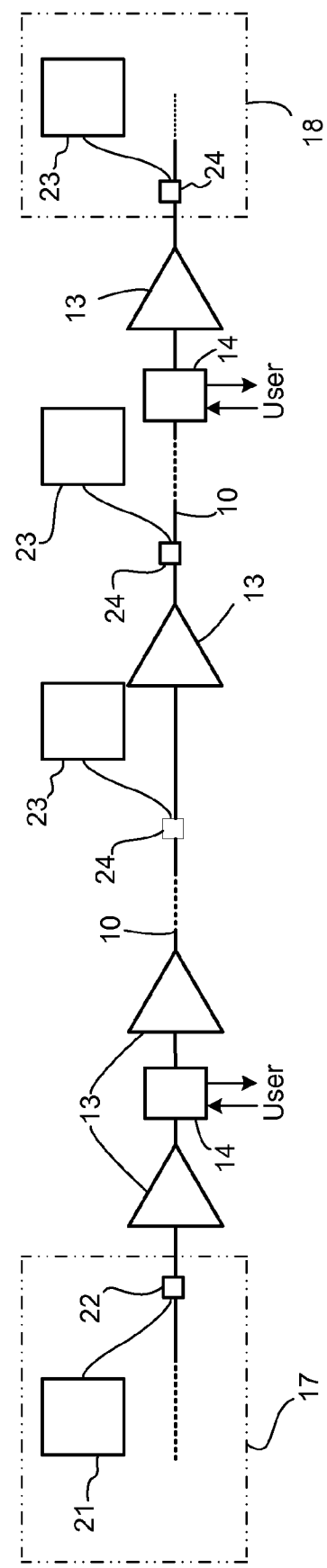
FIG. 2 is a representation of a link with a transmitter and detectors at sites along the link, according to one embodiment of the present invention.

FIG. 2 illustrates an embodiment of the present invention. At the node 17 a coupler 22 connects the output of a chromatic dispersion-determining transmitter 21 to the optical fiber 10. At predetermined sites along the optical fiber 10, splitters 24 separate small portions, i.e., a few percent, of the optical power from the optical fiber 10 for detectors 23. The optical signals of the transmitter 21, along with the data signals from the transmitter 11, are affected by chromatic dispersion in traveling through the optical fiber 10. From these signals of the transmitter 21 a detector 23 obtains information which is used to calculate the chromatic dispersion of the span of optical fiber from the node 17 to the site of the particular detector 23.

FIG. 3A is a block diagram of the transmitter 21. The output of two lasers 31 and 32 are combined by a multiplexer 33. The combined output of the two lasers 31 and 32 is modulated by a modulator 34 which is driven by a circuit 35, which generates signals, such as sinusoidal, square wave and other waveforms, to modulate the output of the lasers 31 and 32. The modulated signals are sent over the optical fiber 10 through the coupler 22 (see FIG. 2). A control block 50 in communication with the network management system controls the operation of the transmitter 21. Specifically, with respect to the present invention, the control block 50 controls the operations of the lasers 31 and 32, including the output wavelength of each of the lasers. An alternative configuration of the transmitter 21 is to modulate the output signals of the two lasers 31 and 32 separately but simultaneously; the two modulated signals are then combined for connection to the multiplexer 22 and the optical fiber 10.

FIG. 3B is a block diagram of another arrangement of the transmitter 21. The same elements with the same reference numerals in FIG. 3A. In this arrangement the lasers 31 and 32 are directly modulated by the circuit 35 and the external modulator 34 of FIG. 3A is not required.

Figure 5A:
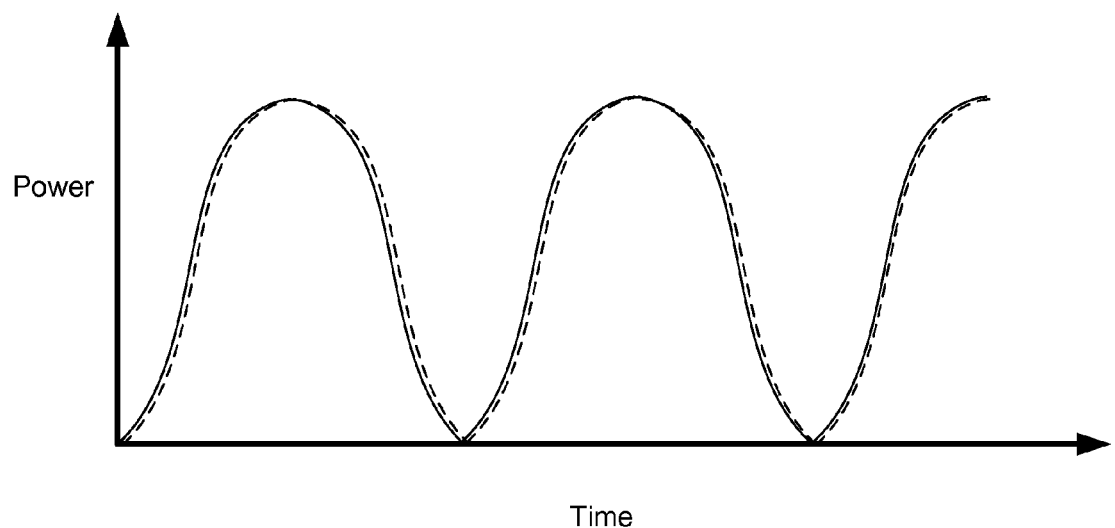
FIG. 5A is a graph of power versus wavelength of an example modulated signal at the output of the FIG. 2 transmitter.
Figure 5B:
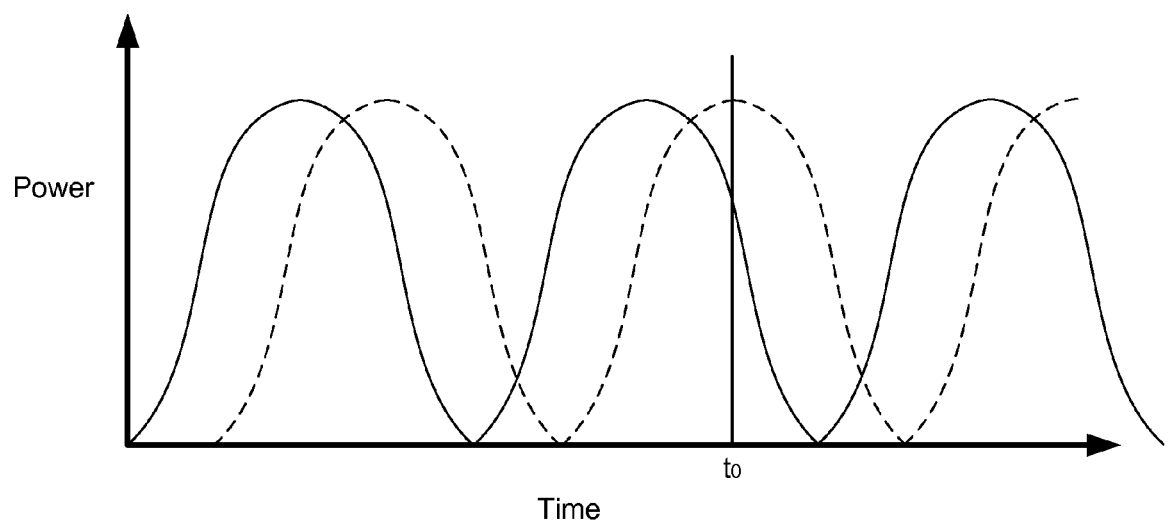
FIG. 5B is a graph of power versus wavelength of the example modulated signal at the input of one of the FIG. 2 detectors.

The resulting output of the transmitter 21 with example modulating sinusoidal waveforms is shown in FIG. 5A. Since the circuit 35 modulates both laser signals (shown by the solid and dotted lines), the phase difference between the two wavelength signals is zero. After traveling down the optical fiber 10 and with the assumption that the chromatic dispersion for the two wavelengths is not completely compensated for by the DCUs in the span between the transmitter 21 and a particular site, the signals at the two wavelengths with a phase difference as illustrated in FIG. 5B. A line at time to helps show the phase difference between the two wavelength signals.

Figure 4A:
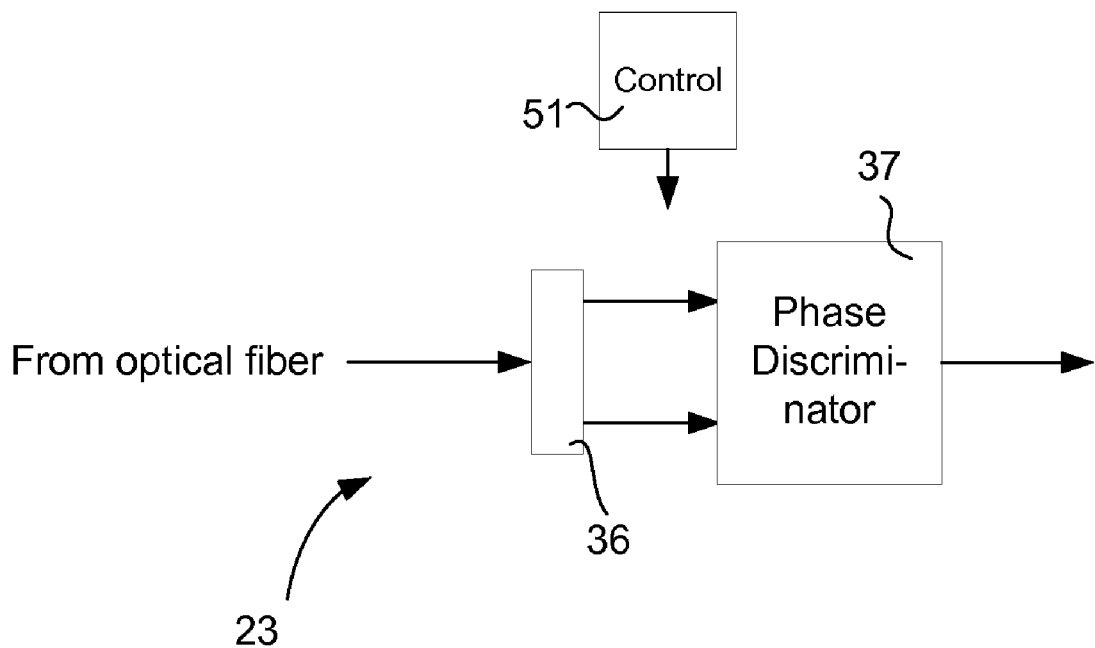
FIG. 4A is a block diagram of a FIG. 2 detector with a fixed wavelength filter according to one embodiment of the present invention.

The phase difference is measured by the detector 23, a block diagram of which is shown in FIG. 4A. Through a splitter 24 the detector 23 receives a small portion of the optical signals carried by the optical fiber 10. The optical signals are directed to a thin film filter 36 which transmits signals at one of the output wavelengths of the transmitter lasers 31 and 32. The output terminals of the filter 36 are connected to a phase discriminator circuit 37, the output terminal of which is connected to a control block 51. The control block 51 stores the phase difference values from the circuit 51 for processing to calculate the chromatic dispersion of the span from the transmitter 21 to the detector 23. With the normal traffic of the network turned off, only signals of the two lasers 31 and 32 are carried on the optical fiber 10. The filter 36 then separates the two output wavelength signals for the phase discriminator circuit 37.

Figure 4B:
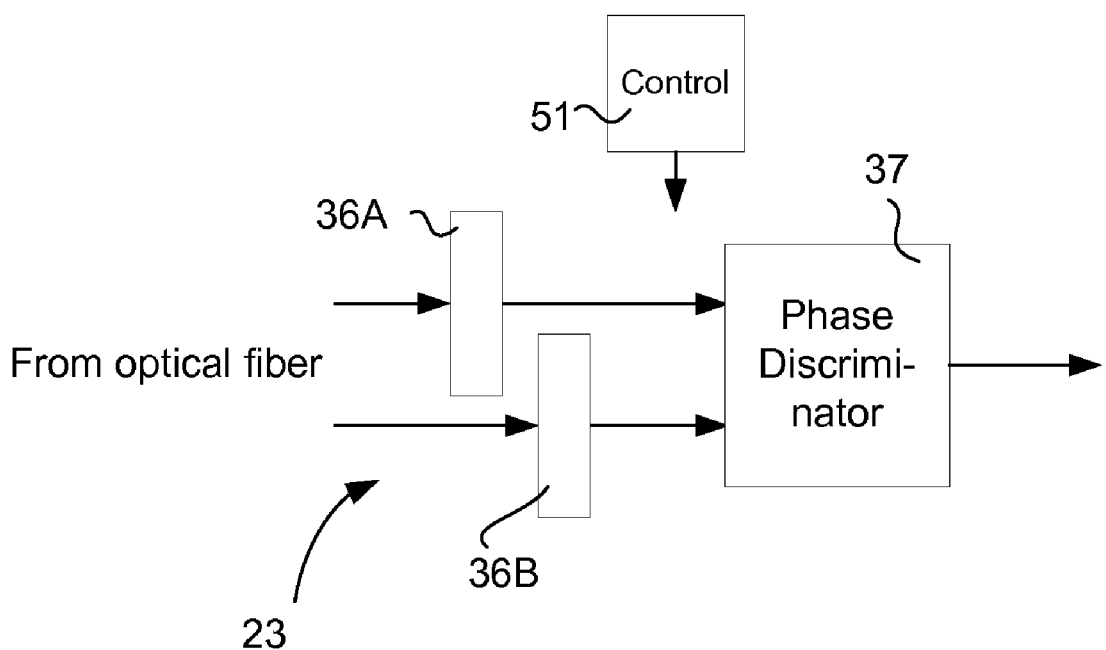
FIG. 4B is a block diagram of another FIG. 2 detector with two fixed wavelength filters according to an embodiment of the present invention.

Another arrangement of the detector 23 is illustrated in FIG. 4B. In this arrangement two thin film filters 36A and 36B, one filter transmitting signals at one of the two laser output wavelengths and the other filter transmitting the other laser output wavelength signals. The filtered outputs of both filters 36A and 36B are sent to the phase discriminator circuit 37. Depending upon the adequacy of signal strength, the input signals to the filters 36A and 36B are obtained by splitting the signals from the splitter 24 again, or using two splitters 24 for each filter 36A and 36B. In this arrangement the normal traffic of the network need not be turned off as long as none of the traffic data operates at the wavelengths of the two transmitter lasers 31 and 32.

With the described detector 23, the phase difference is obtained and $\Delta t$, the group delay time difference, is calculated with $\Omega$, the angular frequency of the modulation. The control block 51 then calculates the chromatic dispersion D from the equation above, $\Delta t = D \cdot L \cdot \Delta \lambda$, since L and $\Delta \lambda$ are known.

Another way of calculating the chromatic dispersion from the obtained phase difference is to assume that $\Phi$ is a particular reference value, say, 90 or 180°. The angular frequency $\Omega$ of the modulation is then varied so that the resulting $\Phi$ matches the reference value. Since $\Delta t$ is the ratio of $\Phi$ over $\Omega$, the same group delay time is obtained to calculate the chromatic dispersion.

Figure 4C:
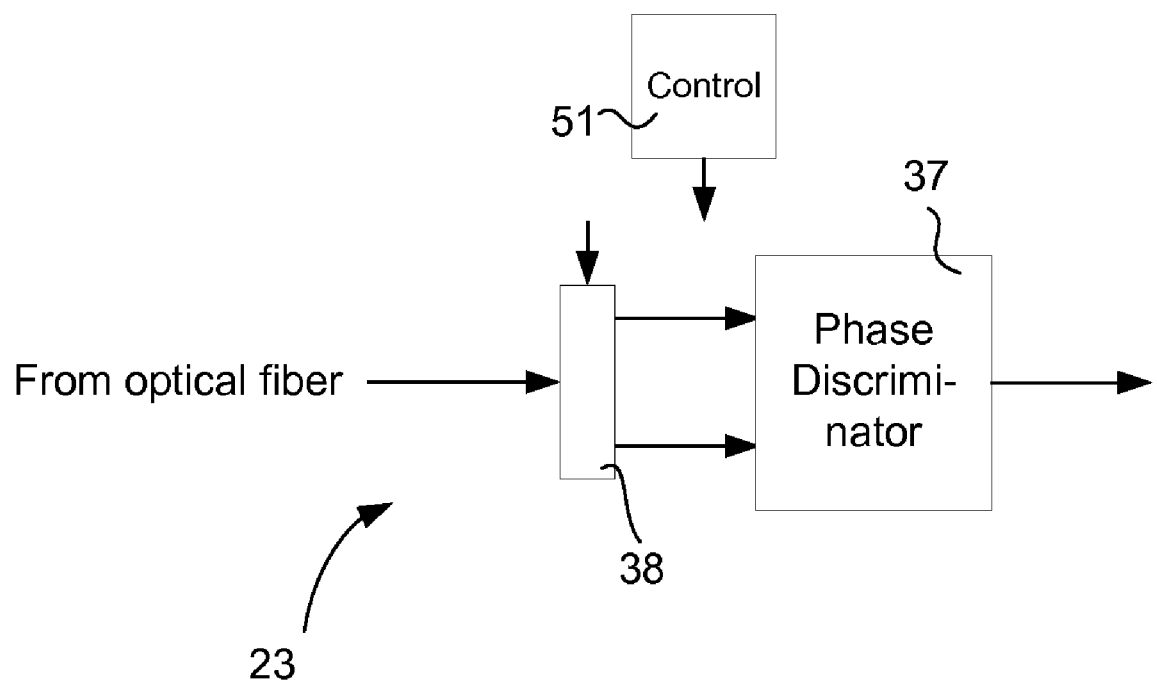
FIG. 4C is a block diagram of another FIG. 2 detector with a variable filter according to an embodiment of the present invention.

If more information is required from said output signals of said first and second lasers, then rather than the simple fixed wavelength filters 36 (and 36A and 36B) described above in the detector 23, a variable filter 38 is used in the detector 22 as shown in FIG. 4C. When the network traffic signals are turned off, the filter 38 filters out all but the signals at the two wavelengths of the lasers 31 and 32. The output terminals of the variable filter 38 are connected to the phase discriminator circuit 37, the output terminal of which is connected to the control block 51. The control block 51 stores the phase difference values from the circuit 51 for processing to calculate the chromatic dispersion of the span from the transmitter 21 to the detector 23. The control block 51 also controls the variable filter 36.

Operationally, after one phase difference is obtained, the output of one or more of the lasers 31 and 32 in the transmitter 21 is changed across a waveband of interest to obtain a series of phase differences for that detector site. The change can be done by changing the output wavelengths of both lasers 31 and 32, or by changing the output wavelength of only one laser. As one or more of the outputs of the lasers 31 and 32 are changed, the variable filter 38 of the detector 23 is also changed accordingly to match the new wavelength(s). Furthermore, some, or all, of the detectors 23 can operate concurrently as the output(s) of the lasers 31 and/or 32 are changed to obtain the phase differences at the different detector sites concurrently.

The series of phase differences across the waveband permits the accumulation of more information. Accuracy in measuring the phase differences is increased, a chromatic dispersion slope over wavelength can be determined, and any timing offset between the output signals of the first and second lasers due to length matching imperfections (for example, due to length mismatch of the optical pigtails both at the transmitter and receiver) can be found by considering differences of phase differences instead of absolute values of phase differences, thereby canceling the mismatch errors which are wavelength independent.

Figure 6:
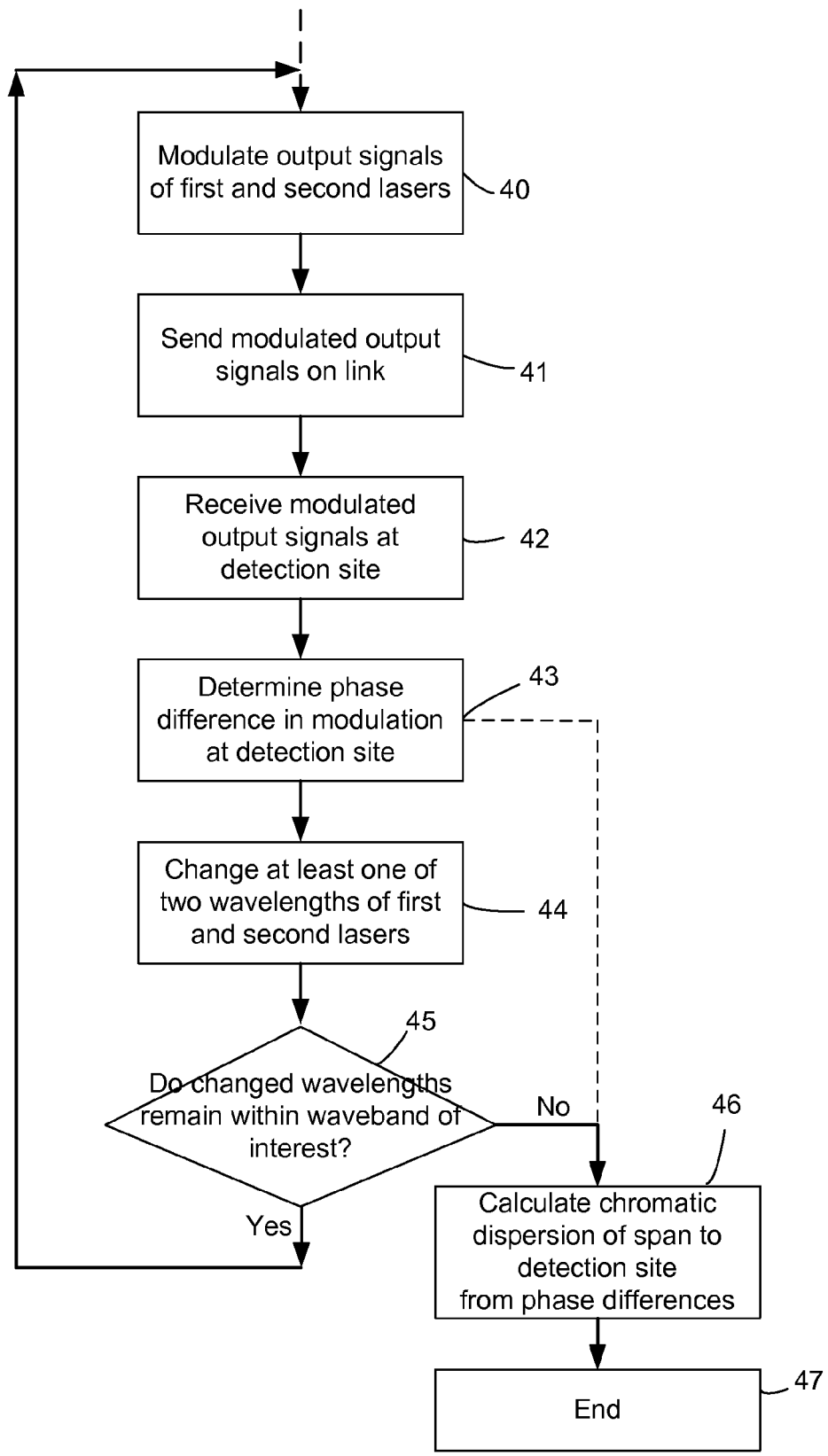
FIG. 6 is a flow chart of operations of the transmitter and one or more of the detectors.

FIG. 6 is a flow chart of operations for the transmitter 21 and detector 23. The dotted line indicates that both the transmitter 21 and detector(s) 23 are already in operation. At step 40 the output signals of the two lasers 31 and 32 in the transmitter 21 are modulated and sent from the transceiver 21 onto the optical fiber 10 of the link by step 41. The signals are received at a detection site of a detector 23 where the phase difference in the modulation of the two laser output signals is determined by step 43. For detectors with fixed wavelength filters the process moves to step 46 where the chromatic dispersion calculated from the phase difference.

With detectors 23 with variable filters (and the transmitter 21 with variable wavelength lasers), the process can continue to steps 44 and 45. The wavelength of at least one of the two lasers in the transmitter 21 is changed as part of stepping the wavelengths through a waveband of interest. The wavelength change can occur after a set amount of time sufficient so that the phase difference can be determined and stored by step 43, or can be controlled by the transmitter control block 50 in communication with the detector control blocks 51 through the network management system. Decision step 45 determines whether the wavelengths of the two lasers remain within the waveband of interest. If yes, the process returns to step 40 in a loop. Note that at step 43 the variable filter 38 of each detector site is adjusted for the new laser wavelength(s). If not, this implies that all the phase differences within the waveband of interest have been obtained and at step 46 the chromatic dispersion of the span from the transmitter 21 to the detector 23 of interest is calculated. With a series of measured phase differences, interpolation techniques are used to obtain a more precise value of the chromatic dispersion, as compared to the chromatic dispersion obtained from a single phase difference measurement. The chromatic dispersion slope over wavelength and any timing offset between the transmitter lasers can also determined. Furthermore, the detector operations can be performed by some, if not all, of the detectors 23 concurrently.

Figure 7:
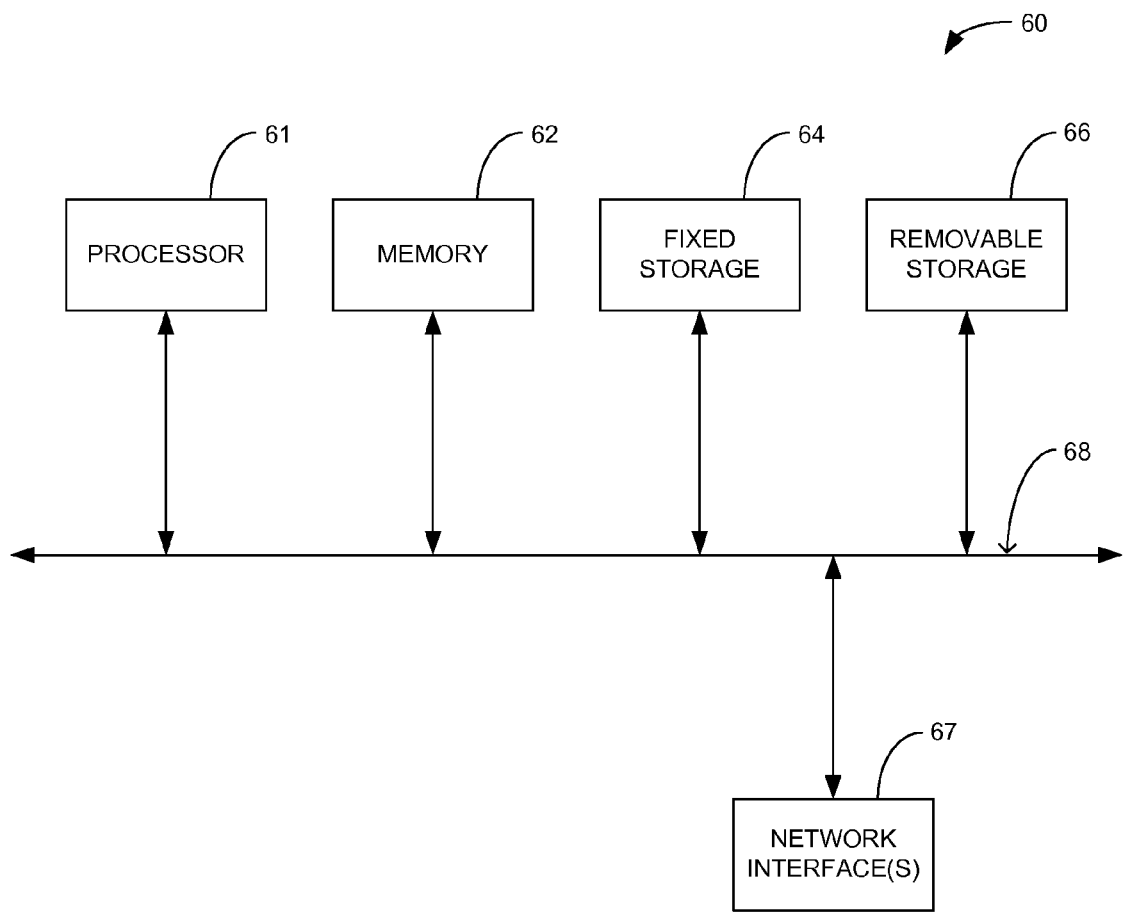
FIG. 7 is a block diagram of the control unit for the FIG. 2 transmitter or detector.

FIG. 7 illustrates the block diagram of one of the control blocks 50 and 51 in transmitter 21 and detectors 23 in FIG. 2 respectively, according to one embodiment of the present invention. The control block 50 (or 51) includes a memory subsystem 62 which can store and retrieve software programs incorporating computer code that implements aspects of the invention, data for use with the invention, and the like and a central processor subsystem 61 which, among other functions, processes the instructions and data of the computer code. Example computer readable storage media for the memory 62 include semiconductor system memory preferably, CD-ROM, floppy disk, tape, flash memory, and hard drive. The control block 50 (or 51) further includes subsystems, such as fixed storage 64 (e.g., hard drive), removable storage 66 (e.g., CD-ROM drive), and one or more network interfaces 67, all connected by a system bus 68. The network interface 67 provides a pathway for transmitter 21 and detectors 23 to communicate with the network management system and each other to synchronize operations. Additional or fewer subsystems in the control block may be used. For example, the control block 50 (or 51) may include more than one processor 41 (i.e., a multi-processor system), or a cache memory.

The control blocks 50 and 51 are mounted on line cards for the transmitter 21 and detector(s) 23 respectively. The transmitter 21 and detector(s) 23 are preferably parts of other network elements and the control blocks can be part of the control units for the network elements. For example, if a detector 23 is part of an OADM 14 (see FIG. 1), the control block 51 can be mounted on the line card holding the control unit of the OADM 14. There is a reduction in parts and network complexity and the detector 23 is located in an advantageous location on the link. The detector 23 can determine the chromatic dispersion of the fiber 10 for the span up to the OADM 14. Another convenient location for a detector 23 is within a DCU (Dispersion Compensation Unit). A typical DCU is a module formed by two serially connected optical amplifiers with a dispersion compensating component between the two optical amplifiers. The dispersion compensating component can be variable or fixed. A detector 23 can also be placed be located between the two optical amplifiers.

Thus the present invention allows the determination of chromatic dispersion at detection sites all along the entire network link. These determinations at these sites can be done concurrently. Furthermore, chromatic dispersion can determined while the WDM network remains in operation. There is no need to shut down the network for special chromatic dispersion measurement operations.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A method comprising:
   at a plurality of detection sites along a link in a dense wavelength division multiplexed (DWDM) network, receiving a plurality of output signals of a plurality of lasers modulated at a modulation frequency such that each of the output signals are at different wavelengths over a waveband;
   at the detection sites, determining phase differences in modulation between each of the output signals;
   at the detection sites, accumulating the phase differences over the waveband to obtain a phase difference measurement; and
   at the detection sites, calculating a chromatic dispersion along the link based on the phase difference measurement and the modulation frequency.

2. The method of claim 1, wherein receiving, determining, accumulating and calculating are performed concurrently at the plurality of detection sites.

3. The method of claim 1, further comprising varying the wavelengths of the output signals over the waveband.

4. The method of claim 3, wherein varying comprises varying the wavelength of only one of the plurality of output signals while maintaining the wavelengths of remaining output signals constant.

5. The method of claim 1, further comprising calculating a chromatic dispersion slope over the different wavelengths and a timing offset between the output signals from the phase difference measurement.

6. The method of claim 1, wherein calculating comprises calculating the chromatic dispersion by assuming the phase difference measurement to be a predetermined value and adjusting the modulation frequency so that the calculated phase difference measurement matches the predetermined value.

7. The method of claim 1, further comprising:
   modulating in concert the output signals of the lasers at the modulation frequency; and
   sending the modulated output signals along the link in the DWDM network.

8. An apparatus comprising:
   a plurality of lasers, each of the plurality of lasers producing a different output wavelength signal;
   a modulator configured to modulate in concert output wavelength signals of the plurality of lasers; and
   a multiplexer configured to couple the output wavelength signals to a link in a dense wavelength division multiplexed (DWDM) network so that phase differences induced by chromatic dispersion upon the modulated output wavelength signals can be accumulated over a predetermined waveband and chromatic dispersion can be calculated from the accumulated phase differences at a plurality of detection sites along the link.

9. The apparatus of claim 8, further comprising a control block configured to control the output wavelength of at least one of the lasers over a predetermined waveband.

10. The apparatus of claim 8, wherein only one laser of the plurality of lasers is configured to controllably change its output wavelength over said predetermined waveband.

11. The apparatus of claim 8, wherein said plurality of lasers are configured to change their output wavelengths over said predetermined waveband.

12. An apparatus comprising:
    at least one variable filter configured to receive optical signals at a site along a link in a dense wavelength division multiplexed (DWDM) network, to output signals at different wavelengths, and to vary the output signals to match a predetermined reference phase; and
    a phase discriminator configured to receive the output signals from the at least one filter, to determine a phase difference in modulation between the optical signals at the different wavelengths, and to calculate chromatic dispersion at a detection site along the link by accumulating the phase difference for each of the output signals.

13. The apparatus of claim 12, wherein the at least one filter comprises a thin film filter.

14. The apparatus of claim 12, wherein the at least one filter is configured to output signals at one of the different wavelengths.

15. A system comprising a plurality of detection sites each having an apparatus of claim 12, and further comprising a control block configured to connect to each apparatus at the plurality of detection sites and to calculate the chromatic dispersion for the detection sites based on the phase difference in modulation between the optical signals.

16. The system of claim 15, wherein the at least one filter comprises a variable filter configured to receive optical signals at least one of the plurality of detection sites along said link, the variable filter controllably filtering out the optical signals at different wavelengths as output signals with the wavelengths change over a predetermined waveband.

17. The system of claim 16, wherein the control block is configured to calculate the chromatic dispersion for each of the detection sites from based on the phase difference in modulation between the optical signals and to control the variable filter to filter out the optical signals at the different wavelengths as they change over the predetermined waveband.

18. The apparatus of claim 12, wherein said detection apparatus is part of a dispersion compensating unit.

* * * * *